United States Patent
Xu et al.

(10) Patent No.: US 12,235,613 B2
(45) Date of Patent: Feb. 25, 2025

(54) WIRELESS TIME SERVICING METHOD, DEVICE, AND SYSTEM

(71) Applicant: INSTITUTE OF GEOLOGY AND GEOPHYSICS, THE CHINESE ACADEMY OF SCIENCES, Beijing (CN)

(72) Inventors: Xiqiang Xu, Beijing (CN); Tianyao Hao, Beijing (CN); Yaoxing Hu, Beijing (CN)

(73) Assignee: INSTITUTE OF GEOLOGY AND GEOPHYSICS, THE CHINESE ACADEMY OF SCIENCES, Beijing (CN)

( * ) Notice: Subject to any disclaimer, the term of this patent is extended or adjusted under 35 U.S.C. 154(b) by 531 days.

(21) Appl. No.: 17/529,295

(22) Filed: Nov. 18, 2021

(65) Prior Publication Data
US 2022/0269223 A1   Aug. 25, 2022

Related U.S. Application Data

(63) Continuation of application No. PCT/CN2021/077581, filed on Feb. 24, 2021.

(51) Int. Cl.
*G04R 20/14* (2013.01)
*G04F 5/14* (2006.01)
*G04R 40/00* (2013.01)
*H04W 56/00* (2009.01)

(52) U.S. Cl.
CPC .............. *G04R 20/14* (2013.01); *G04F 5/14* (2013.01); *G04R 40/00* (2013.01); *H04W 56/0035* (2013.01)

(58) Field of Classification Search
CPC ........... G04R 20/14; G04R 40/00; G04F 5/14; H04W 56/0035
See application file for complete search history.

(56) References Cited

U.S. PATENT DOCUMENTS

| | | | |
|---|---|---|---|
| 4,845,692 A * | 7/1989 | Groslambert | G04F 5/14 368/200 |
| 2006/0202771 A1* | 9/2006 | Seki | G04G 3/00 331/158 |
| 2012/0188125 A1* | 7/2012 | Pomietlasz | G01S 13/87 342/357.68 |

FOREIGN PATENT DOCUMENTS

| | | | | |
|---|---|---|---|---|
| CN | 106647223 A | * | 5/2017 | |
| CN | 111711506 A | * | 9/2020 | G01S 19/256 |

OTHER PUBLICATIONS

AllanDeviationExample.gif, Wikipedia (Year: 2016).*
(Continued)

*Primary Examiner* — Renee S Luebke
*Assistant Examiner* — Matthew Hwang

(57) ABSTRACT

Provided is a wireless time servicing method, device and system. The wireless time servicing method includes: obtaining absolute time information sent by an external clock source; correcting a system time of a master station according to the absolute time information; broadcasting path information to a slave station; receiving feedback from the slave station in response to the path information, calculating a transmission path delay between the master station and the slave station, and storing the transmission path delay in the time information; and sending the time information to the slave station.

9 Claims, 2 Drawing Sheets

(56) References Cited

OTHER PUBLICATIONS

Translation of CN106647223, Espacenet (Year: 2024).*
Translation of CN111711506, Espacenet (Year: 2024).*
Curve fitting, Wikipedia (Year: 2018).*
How the Computer Works, Wolfe (Year: 2018).*
Definition of "steady state," Merriam Webster (Year: 2024).*

* cited by examiner

WIRELESS TIME SERVICING METHOD, DEVICE, AND SYSTEM

CROSS-REFERENCE TO RELATED APPLICATIONS

This application is a U.S. continuation of co-pending International Patent Application Number PCT/CN2021/077581, filed on Feb. 24, 2021, with China National Intellectual Property Administration, the disclosure of which is incorporated herein by reference in its entirety.

TECHNICAL FIELD

This disclosure relates to gas bearing technology, and more particularly relates to a wireless time servicing method, device, and system.

BACKGROUND

In the field of seismic exploration, an instrument itself needs to obtain absolute time. Existing technical methods of time servicing usually include: 1) Use a GPS/BeiDou time receiver to receive wireless signals from a GPS/BeiDou satellite, and then analyze the signals and time the instrument accordingly; 2) Use wired methods such as networks to time the equipment according to different time servicing protocols; and 3) For devices connected to a wireless network, the current time servicing algorithms use the wireless network as the transmission medium, and use the traditional methods based on NTP, PTP, or their variants for time servicing purposes.

The above three methods can all be used for time servicing purposes. However, regarding the first time servicing method, if the application environment is in a non-open area e.g. a mine, because it has a poor airborne signal, the signal from GPS/BeiDou satellite cannot be received in this case, such that the time service will become invalid. Regarding the second time service method, in a closed construction environment, it is inconvenient to lay cables when there are various obstacles in the collection area, and the cable layout will also greatly increase the cost of construction, and so the time service will not be available in this case. Regarding the third time servicing method, the time service is based on network protocols such as TCP/UDP, which greatly increases the hardware cost, and it is based on a multi-layer protocol, so that the response of the instrument is uncertain and the network delay cannot be estimated, thereby resulting in a very low timing accuracy.

SUMMARY

It is therefore an object of this disclosure to provide a wireless time servicing method, device and system, which aim to solve the technical problem of low wireless time servicing precision in the related art.

According to a first aspect, the present disclosure provides a wireless time servicing method applied to a master station in a wireless time servicing system, the wireless time servicing method including:
  obtaining absolute time information sent by an external clock source;
  correcting a system time of the master station according to the absolute time information;
  broadcasting path information to a slave station;
  receiving a feedback from the slave station for the path information, calculating a transmission path delay between the master station and the slave station, and storing the transmission path delay in the time information; and
  transmitting the time information to the slave station.

Optionally, the operation of correcting the system time of the master station according to the absolute time information includes:
  performing atomic clock taming using different taming periods depending on an input signal precision of different external clock sources.

Optionally, the operation of correcting the system time of the master station according to the absolute time information includes:
  calculating a clock error evaluation period based on the performance of a crystal oscillator in the master station;
  calculating a difference between the system time of the master station and a standard clock within the clock error evaluation period; and
  correcting the system time of the master station based on the error between a next signal and the system time of the master station and the difference.

Optionally, the path information and the time information are broadcast to the slave station in different integer seconds.

According to a second aspect, the present disclosure provides a wireless time servicing method applied to a slave station in a wireless time servicing system, the wireless time servicing method including:
  returning a feedback to a master station with respect to path information broadcast by the master station;
  receiving time information sent by the master station; and
  correcting a system time of the slave station according to the difference between the time information and the system time of the slave station.

Optionally, the operation of correcting the system time of the slave station according to the difference between the time information and the system time of the slave station includes:
  extracting a system time of the master station and a transmission path delay from the time information;
  calculating the time difference according to the system time of the master station, the transmission path delay, and the system time of the slave station;
  calculating an Allan variance through the time difference obtained by multiple calculations;
  determining whether the system time of the slave station reaches a steady state according to the Allan variance; and
  using the time difference to correct the system time of the slave station after the system time of the slave station reaches a steady state.

Optionally, the operation of determining whether the system time of the slave station reaches a steady state according to the Allan variance includes:
  performing curve fitting on the Allan variance obtained by multiple calculations; and
  determining whether the system time of the slave station reaches the steady state according to a slope of the curve.

According to a third aspect, the present disclosure provides a wireless time servicing device, including:
  a path information feedback module used for returning a feedback to a master station with respect to path information broadcast by the master station;
  a time information receiver module used for receiving time information sent by the master station; and a time correction module used for correcting a system time of the slave station according to the difference between the time information and the system time of the slave station.

According to a fourth aspect, the present disclosure provides a wireless time servicing system, including:

a processor; and a memory communicatively connected with the processor; wherein, the memory stores readable instructions, which when executed by the processor cause the methods described in the first and second aspects to be performed.

According to a fifth aspect, the present disclosure provides a computer-readable storage medium in which a computer program is stored, wherein the computer program, when executed, causes the methods of the first and second aspects to be performed.

In the wireless time servicing method, device, and system provided by the present disclosure, wireless transmission is relied on to realize wireless time service through a self-organizing network mode without needing a network protocol, which effectively reduces the implementation cost and increases the time servicing stability of the system. And because the broadcast mode is adopted, there is no need to rely on returning handshaking information, thus increasing the time servicing reliability. In addition, the Allan variance method is used to evaluate the uncertainties of the system such as the transmission path delay, which can effectively and accurately estimate the network delay, thereby greatly increasing the accuracy of the time service.

DETAILED DESCRIPTION OF ILLUSTRATIVE EMBODIMENTS

For a better understanding of the objectives, technical solutions, and advantages of the present application, hereinafter the present application will be described in further detail in connection with the accompanying drawings and some illustrative embodiments. It is to be understood that the specific embodiments described here are intended for the mere purposes of illustrating this application, instead of limiting.

The specific implementation of the present disclosure will be described in detail below in connection with specific embodiments.

Embodiment 1

Figure 1:
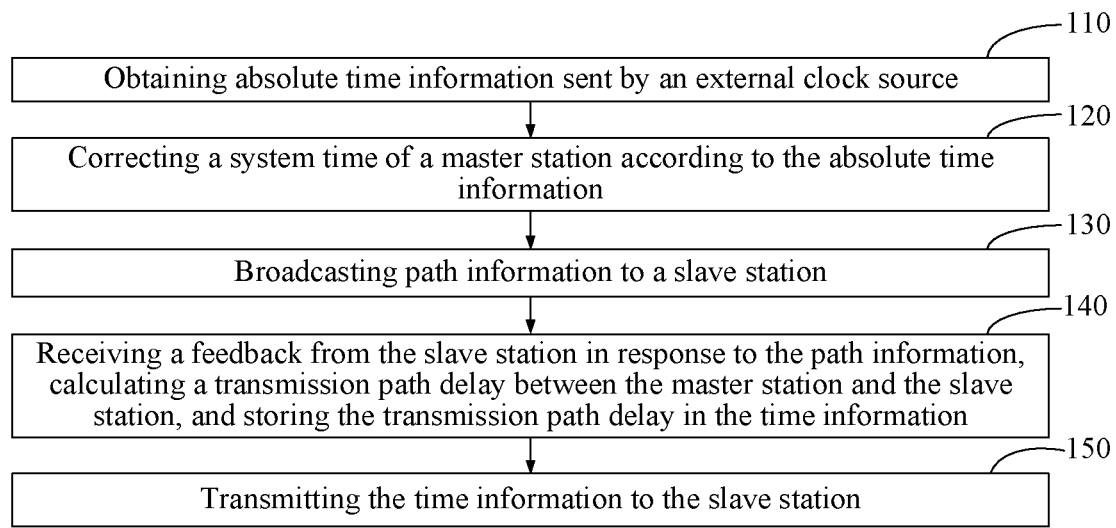
FIG. 1 is a flowchart of a wireless time servicing method according to a first embodiment.

FIG. 1 is a flowchart of a wireless time servicing method according to a first embodiment. The wireless time servicing method illustrated in the first embodiment is applicable to a master station of the wireless time servicing system, and a processor is provided in the wireless time servicing system to perform wireless time service on the instrument.

It should be noted that the wireless time servicing system includes a master station and a slave station. The master station distributes the time stamp to the slave station after obtaining the absolute time, and the slave station performs time correction on its own systems after obtaining the time information distributed by the master station. Since the master station and the slave station adopt the broadcast mode, there is no need to rely on the returning of handshaking information, which increases the reliability of time service, and the system transmission path delay and other uncertainties are evaluated, which can effectively and accurately estimate the transmission path delay, thereby greatly increasing the precision of time servicing.

In S110, the time servicing method includes obtaining absolute time information sent by an external clock source.

In S120, the time servicing method includes correcting a system time of the master station according to the absolute time information.

In S130, the time servicing method includes broadcasting path information to a slave station.

In S140, the time servicing method includes receiving a feedback from the slave station for the path information, calculating a transmission path delay between the master station and the slave station, and storing the transmission path delay in the time information.

In S150, the time servicing method includes transmitting the time information to the slave station.

Through the above steps, the master station maintains its own absolute time and distributes wireless time beacons to the slave stations.

Typically, the master station contains the following modules: 1) An external clock source receiver module, used to receive time information from an external clock source; 2) An internal clock module, such as an atomic clock, an ordinary RC crystal oscillator, etc.; 3) A wireless transmission module, used to wirelessly transmit the time stamp information to the slave stations.

In particular, the master station obtains the absolute time from an external clock source, and corrects the system time of the master station according to the absolute time. After it obtains the absolute time from the external clock source, the master station grants the time information to its own master station time system through its own time service screening algorithm. For different internal timekeeping modules, different time servicing methods are used. For example, an atomic clock taming method, an external reliable clock correction method, or the like can be used.

In terms of the atomic clock taming mode, different taming parameters may be input for different signal sources. For signal sources such as GPS whose signal output is poor in steady-state variance, the taming period can be set to 5000 seconds to offset the influence of the error of the signal source itself. For high-precision signal sources such as rubidium clocks, the taming period can be set to 10 seconds to achieve rapid taming.

When its own timekeeping module has a poor accuracy, an external reliable clock source can be used to correct the clock of the master node in real time. First, the clock error evaluation period is calculated based on the performance of the crystal oscillator in the master station, then the difference between the master station system time and the standard clock is calculated within the clock error evaluation period, and finally the master station system time is corrected based on the error between the next signal and the master station system time and the difference.

Specifically, the correction method can adopt the following steps: 1) Calculate the clock error evaluation period based on its own crystal oscillator stability and evaluation accuracy. The clock error evaluation period is equal to the evaluation accuracy divided by its own crystal oscillator stability and then divided by 10; 2) Evaluate the difference between its own clock and the standard clock within the clock error evaluation period, and calculate the average value by means of statistics; 3) Perform screening when the next time synchronization signal comes. The screening mechanism calculate whether the difference of the error between the next time synchronization signal and its own clock from the above-mentioned statistical average is within the evaluation accuracy. If it is within the evaluation accuracy, it will be assigned as a credible latest time signal. If otherwise, recalculate whether the difference of the error between the next time synchronization signal and its own clock from the above-mentioned statistical average lies within the evaluation accuracy. If it lies within the evaluation accuracy, it will be assigned as a credible latest time signal. If otherwise, continue the screening, and when the number of screenings reaches 10 times and the above condition is still not satisfied, then reduce the evaluation accuracy and repeat the initial steps above.

Path information refers to the data packets used to evaluate the path delay of the wireless transmission network between the master station and the slave station. It adopts the fixed-point sending method, and its purpose is to evaluate the network path delay of wireless transmission from the master station to the slave station. Because the relative distances between different slave stations and the master station are different during implementation, and the wireless network environments they are situated in are different, it is necessary to evaluate the path delay of its wireless transmission to ensure that the slave station obtains the time information accurately.

Since it needs to evaluate the network path delay, the master station needs to send the path information to the slave stations in sequence. Each time it sends a message to only one slave station. For example, if there are two slave stations, it will send a message to the first slave station in the first base second, and send a message to the second slave station in the second base second. Thus, in order the distinguish from the data packets that send the path information, when broadcasting the time information and path information to the slave stations, the time information and path information are broadcast to the slave stations separately in the integer seconds of the master station time system, thereby staggering the broadcasting of time information and path information, so that the time information and path information do not interfere with each other, thereby achieving the purpose of efficient transmission, and further ensuring the accuracy of wireless time servicing.

In addition, since the broadcast is performed in integer seconds of the master station system time, only the year, month, day, hour, minute, and second information needs to be broadcast, and there is no need to broadcast the decimal information within seconds (the decimal information can reach milliseconds, microseconds or even nanoseconds depending on the precision), so the following can be achieved: 1) The master station greatly saves the amount of broadcast data; 2) Since the master station uses broadcast, there is no need to repeat the broadcast, which can greatly reduce the transmission load of the master station; 3. The same broadcast is sent only once, so it can greatly improve the time servicing accuracy; 4) After is receives the information, the slave station only needs to subtract the network path delay in the data packet in order to get the accurate whole second time since the master station broadcasts the information in integer seconds, and the fractional information within the second, so the calculation is faster and more efficient.

When the master station broadcasts the integer-seconds time information and the path information, its function is to count the transmission path delay of each slave station. After the broadcast, the feedback of each slave station is processed in the interrupt program, and then the transmission path delay of each slave station is calculated. The transmission path delay of each slave station is equal to half of the time difference from the broadcast time to the reception time. After the transmission path delay of each slave station is calculated, the transmission path delay is written into the time information and sent to the slave station.

Optionally, the broadcasting of the time information and path information at integer seconds is performed using an interrupt-based method in the master station. If the internal clock carries a bit, the interrupt program whose priority is second only to the internal clock carry will be triggered immediately, where its time information will be broadcast in this interrupt program, which can ensure the accuracy of sending time information and further reduce the algorithm complexity of the subsequent clock synchronization at the slave station.

Embodiment 2

Figure 2:
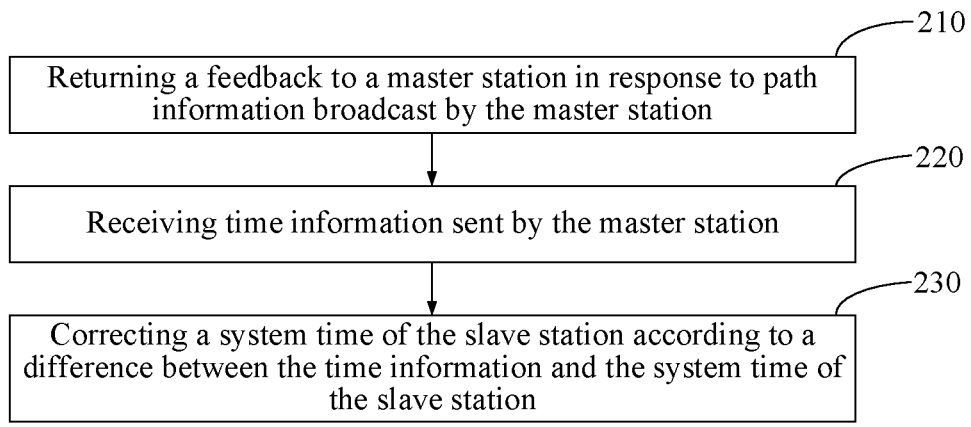
FIG. 2 is a flowchart of a wireless time servicing method according to a second embodiment.

FIG. 2 is a flowchart of a wireless time servicing method according to a second embodiment. The wireless time servicing method illustrated in the second embodiment is applicable to a slave station of the wireless time servicing system, and a processor is provided in the wireless time servicing system to perform wireless time service on the instrument.

It should be noted that the wireless time servicing system includes a master station and a slave station. The master station distributes the time stamp to the slave station after obtaining the absolute time, and the slave station performs time correction on its own systems after obtaining the time information distributed by the master station. Since the master station and the slave station adopt the broadcast mode, there is no need to rely on the returning of handshaking information, which increases the reliability of time service, and the system transmission path delay and other uncertainties are evaluated, which can effectively and accurately estimate the transmission path delay, thereby greatly increasing the precision of time servicing.

For ease of description, only the parts related to this embodiment of the present disclosure are illustrated, which are described in detail as follows:

In S210, the time servicing method includes returning a feedback to a master station with respect to path information broadcast by the master station;

In S220, the time servicing method includes receiving time information sent by the master station; and In S230, the time servicing method includes correcting a system time of the slave station according to the difference between the time information and the system time of the slave station.

As described in the first embodiment, when performing wireless time service, the master station will broadcast path information to the slave stations. After receiving the path information broadcast by the master station, the slave station will return the path information to the master station so that the master station can calculate the transmission path delay between each other.

Since the time information sent by the master station contains the time information of the master station and the transmission path delays from the master station to the slave stations, after receiving the time information sent by the master station, the slave station can perform time correction accordingly.

In particular, when correcting the slave station system time according to the difference between the time information and the slave station system time, the master station system time and the transmission path delay are extracted from the time information, and then the time difference is calculated according to the master station system time, the transmission path delay and the slave station system time, then the Allan variance is calculated through the time differences obtained by multiple calculations, and finally it is determined whether the slave station system time reaches the steady state according to the Allan variance. After the slave station system time reaches a steady state, the time difference is used to correct the slave station system time.

Allan variance is a special variance calculation method, which is illustrated as follows:

$$\epsilon_t = \tfrac{1}{2} \langle [\nabla t_{n+1}(t) - \nabla t_n(t)]^2 \rangle$$

Where $\nabla t_{n+1}(t)$ and $\nabla t_n(t)$ correspond to the $\Delta t$ values of the adjacent (n+1)th item and n-th item at time t respectively, $\langle * \rangle$ refers to the overall average value, which represents the overall average value of the square of the difference between two adjacent values of all values in the array at this moment, and then divided by 2.

Through the above calculation, the different components in the noise and the changes over time can be analyzed, so as to effectively estimate the noise. Since the network delay is numerically affected by various environments, and its essence is inherent delay plus random noise, it is necessary to use the method of calculating Allan variance to evaluate the true transmission path delay.

Allan variance is a curve that changes with time, and it must go through the following stages as time increases:

Quantization noise stage: At this time, the curve composed of data is a primary curve, and its slope is −1. At this time, it means that the collected data samples are not enough, and the data samples cannot meet the requirements of evaluating the real network delay state. The error mainly comes from the quantization error of its collection, and it is necessary to continue to increase the sample size.

Angle random walk stage: At this time, as the sample data increases, it gradually reflects the true value of the sample with the noise removed, but the sample data is not enough and it is more stable than the previous stage. The source of the error at this time mainly comes from the phase change of the true value, that is, the angle change state, which is the angle random walk phase. At this time, it is necessary to continue to increase the samples.

Sine noise stage: At this time, the sample is basically enough. After the above two states, the sample can basically meet the observation conditions. The curve composed of its Allan variance has no fixed slope at this time and is in the back and forth oscillation stage, so the state at this time is named the sinusoidal noise stage.

Steady state: After several sinusoidal noise stages, the number of samples at this time can fully reflect the true internal value. Therefore, the state at this time is defined as a steady state. The true network delay value can be calculated by counting the values of internal samples at this time.

Since the above-mentioned stages are the necessary stages for calculating the curve generated by the Allan variance, in the quantization noise stage it is manifested as a first-order curve with a slope of −1, and in the angle random walk stage it is manifested as a primary curve with a slope of −0.5, and in the sinusoidal noise phase, it is manifested as a back and forth oscillating curve. Therefore, the slopes of the curve can be used to quickly determine the state of the Allan variance curve, and then make a quick judgment. That is, by performing curve fitting on the Allan variance obtained by multiple calculations, and according to the slopes of the curves, it can be determined whether the slave station system time reaches a steady state.

For example, take the $\Delta t$ from this moment and the values of the forward four nearest sample points as the fitting samples of the primary curve. If the slope K of the fitted instrument curve at this time is around −0.5, it means that it is in the angle random walk stage at this time. When the slope K of the fitted curve hovers between positive and negative values, it is in the sinusoidal noise stage. When the slope K of the fitted curve has a slope of 0 for several consecutive times or the probability of a slope of 0 is greater than 50%, it is determined that the curve has reached a steady state at this time.

Optionally, when the slave station performs wireless time servicing, the specific steps may be as follows:

(1) When the wireless module of the slave station receives the path information sent from the master station, the wireless module will send the data to the master station of the slave node through the serial port, and after the master station receives this information through interruption, it will immediately return path information in this interruption. Since this path information is used in the master node to calculate the path delay, there is no need to attach other information, which increases the timeliness, conciseness, and effectiveness of the transmission.

(2) When the wireless module receives the time information, the time information sent to the master station in the form of a serial port, and the master station processes the time information in the interrupt. At this time, the local time LoCT1 at this point is recorded, and the time information RotT1 and the transmission path delay information RotDelay contained in the data packet are analyzed, and then the time difference at this time is calculated by the following formula:

$$\Delta t = LocT1 - (RotT1 + Rot\text{Delay})$$

Then $\Delta t$ to is assigned to the clock difference value ErrT each time.

(3) Create a dynamic array ErrTArr, which is used to store the clock difference value ErrT each time, and define the variable ErrTArrN to record the number of dynamic arrays. After step 2, the clock difference value ErrT is stored in the dynamic array. The number $N_{\Delta t}$ of data increases, and ErrTArrN increases accordingly, and again calculate the Allan variance $\epsilon_t$ of all variables in the array at this time. The calculation formula of this Allan variance $\epsilon_t$ is:

$$\epsilon_t = \tfrac{1}{2} \langle [\nabla t_{n+1}(t) - \nabla t_n(t)]^2 \rangle$$

Where $\nabla t_{n+1}(t)$ and $\nabla t_n(t)$ correspond to the $\Delta t$ values of the adjacent (n+1)th item and n-th item at time t respectively, $\langle * \rangle$ means the overall average value, which represents the overall average value of the square of the difference between two adjacent values of all values in the array at this moment, and then divided by 2.

In this embodiment, in particular, the difference between the adjacent two items of all the variables in the dynamic array ErrTArr is calculated, and then these differences are squared and stored in the new dynamic array ErrTDelArr, and then the overall average of all items in the dynamic array ErrTDelArr is calculated again, and then this average is divided by 2 to be assigned the Allan variance $\varepsilon_t$.

(4) Create a new dynamic array ErrTArrAllan, store the Allan variance $\varepsilon_t$ calculated in the above steps into the dynamic array, and then evaluate whether the curve that fits all the variables in the dynamic array ErrTArrAllan reaches the stagnation point, and the judgment algorithm is implemented as follows: First determine the number ErrTArrAllanLen of samples in the dynamic array at this time. If ErrTArrAllanLen is less than 4 at this time, return to step 2. If ErrTArrAllanLen is greater than or equal to 4 at this time, then take four adjacent variables from the end of the dynamic array forward to form a new sample to be fitted, and then perform a first-order term fitting on the sample to be fitted, then determine the slope K of the first order term of this fitting. If the slope K of the fitted first order curve is around −1 at this time, it means that it is in the quantization noise stage at this time. If the slope K of the fitted instrument curve is around −0.5 at this time, it means that it is in the angle random walk phase at this time. When the slope of the fitted curve K is hovering between positive and negative values, it is in the sinusoidal noise phase. When the slope K of the fitted curve has a slope of 0 for several consecutive times or the probability of a slope of 0 is greater than 50%, it is determined that the curve has reached a steady state at this time. Then the algorithm proceeds to the next step.

(5) At this time, calculate the average value of all the variables that are in the number of ErrTArrN in the dynamic array ErrTArr, thus obtaining an average value $M_{Ar}$, and assign this average value to the variable ErrTMean.

(6) Assign this ErrTMean value to the adjusted clock difference value ErrTMeanAdj, and then reset the related variables. The related variables are ErrT, ErrTArr, ErrTDelArr, ErrTArrAllan. The slave station adjusts its own clock. The way the slave station adjusts its own clock can be adjusted according to its own clock operation mode. In this example, through the calculated clock difference value, first adjust the beyond-second difference value ErrTMeanAdjSec greater than 1 second, and when the second digit of the own clock is carried, it is adjusted to the latest second digit by ErrTMeanAdjSec, and then adjusting the within-second clock difference value ErrTMeanAdjSecPre, where the adjustment method includes adjusting the within-second clock to be the count value of the internal timer when the second digit of its own clock is carried. After the adjustment is completed, the internal clock of the slave station can be synchronized to the latest level.

Embodiment 3

Figure 3:
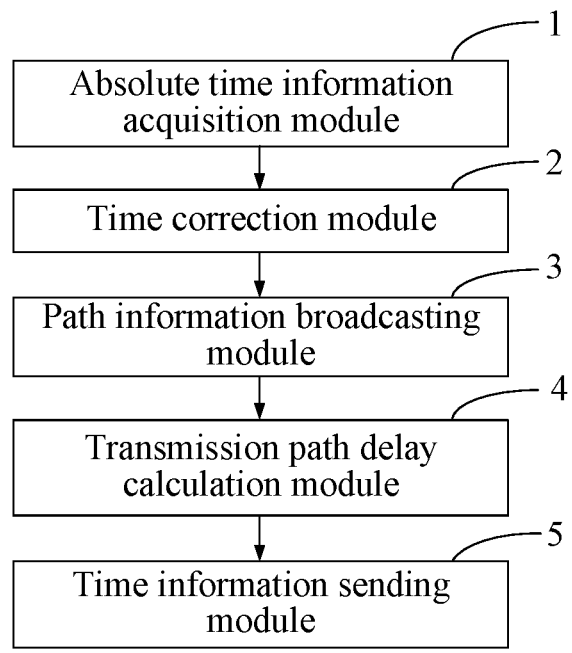
FIG. 3 is a block diagram of a wireless time servicing device according to a third embodiment.

As illustrated in FIG. 3, the third embodiment of the present disclosure provides a wireless time servicing device, which is applied to a master station in a wireless time servicing system, and the device can perform all or part of the steps of any one of the wireless time servicing methods described above. The device includes:

absolute time information acquisition module 1 configured for obtaining absolute time information sent by an external clock source;

a time correction module 2 configured for correcting a system time of the master station according to the absolute time information;

a path information broadcasting module 3 configured for broadcasting path information to a slave station;

a transmission path delay calculation module 4 configured for receiving a feedback from the slave station for the path information, calculating a transmission path delay between the master station and the slave station, and storing the transmission path delay in the time information; and a time information sending module 5 configured for transmitting the time information to the slave station.

Figure 4:
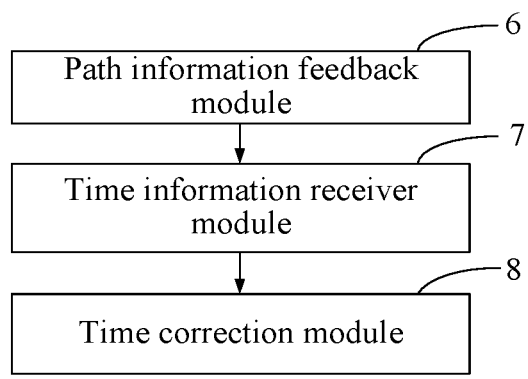
FIG. 4 is a block diagram of another wireless time servicing device according to the third embodiment.

As illustrated in FIG. 4, the third embodiment of the present disclosure provides another wireless time servicing device, which is applied to a slave station in a wireless time servicing system, and the device can perform all or part of the steps of any one of the wireless time servicing methods described above. The device includes:

a path information feedback module 6 used for returning a feedback to a master station with respect to path information broadcast by the master station;

a time information receiver module 7 used for receiving time information sent by the master station; and a time correction module 8 used for correcting a system time of the slave station according to the difference between the time information and the system time of the slave station.

Embodiment 4

The fourth embodiment of the present disclosure provides a wireless time servicing system, which can execute all or part of the steps of any one of the wireless time servicing methods described above. The wireless time servicing system includes:

a processor; and a memory communicatively connected with the processor; wherein the memory stores instructions that can be executed by the at least one processor, and the instructions when executed by the at least one processor cause the at least one processor to execute the method described in any one of the above-mentioned illustrative embodiments, which however will not be elaborated here.

Embodiments according to the disclosure further provide a storage medium which is a computer-readable storage medium. For example, it may include a transitory and non-transitory computer-readable storage medium containing instructions. The storage medium includes, for example, a memory including instructions, and the instructions can be executed by the processor of the server system to perform the wireless time servicing methods.

The above description of the disclosed embodiments enables those having ordinary skill in the art to implement or use the present disclosure. Various modifications to these embodiments will be obvious to those having ordinary skill in the art, and the general principles defined in the present disclosure may be implemented in other embodiments without departing from the spirit or scope of the present disclosure. Therefore, the present disclosure will not be limited to the embodiments disclosed herein, but should conform to the widest scope consistent with the principles and novel features disclosed in the present disclosure.

What is claimed is:

1. A wireless time servicing method applied to a master station in a wireless time servicing system, the wireless time servicing method comprising operations of:

obtaining absolute time information sent by an external clock source;

correcting a system time of the master station according to the absolute time information;

broadcasting path information to a slave station;

receiving a feedback from the slave station in response to the path information, calculating a transmission path delay between the master station and the slave station, and storing the transmission path delay in time information; and sending the time information to the slave station;

wherein the operation of correcting the system time of the master station according to the absolute time information comprises:

performing atomic clock taming using different taming periods depending on an input signal precision of different external clock sources;

wherein the operation of performing atomic clock taming using different taming periods depending on the input signal precision of different external clock sources comprises:

setting the taming period to 5000 seconds when the external clock source is a GPS signal source; or setting the taming period to 10 seconds when the external clock source is a rubidium clock.

2. The wireless time servicing method of claim 1, wherein the operation of correcting the system time of the master station according to the absolute time information comprises:

calculating a clock error evaluation period based on a performance of a crystal oscillator in the master station, wherein the clock error evaluation period is equal to an evaluation accuracy divided by a crystal oscillator stability of the crystal oscillator and then divided by 10;

calculating a difference between the system time of the master station and a standard clock within the clock error evaluation period; and correcting the system time of the master station based on an error between a next signal and the system time of the master station and the difference.

3. The wireless time servicing method of claim 1, wherein the path information and the time information are broadcast to the slave station at different integer seconds.

4. A computer-readable storage medium having stored therein a computer program, which when executed by a processor causes the method of claim 1 to be performed.

5. The computer-readable storage medium of claim 4, wherein the operation of correcting the system time of the master station according to the absolute time information comprises:

calculating a clock error evaluation period based on a performance of a crystal oscillator in the master station, wherein the clock error evaluation period is equal to an evaluation accuracy divided by a crystal oscillator stability of the crystal oscillator and then divided by 10;

calculating a difference between the system time of the master station and a standard clock within the clock error evaluation period; and correcting the system time of the master station based on an error between a next signal and the system time of the master station and the difference.

6. The computer-readable storage medium of claim 4, wherein the path information and the time information are broadcast to the slave station at different integer seconds.

7. A wireless time servicing system, comprising:

a processor; and a memory communicatively coupled with the processor, wherein the memory stores readable instructions, which when executed by the processor cause the method of claim 1 to be performed.

8. The wireless time servicing system of claim 7, wherein the operation of correcting the system time of the master station according to the absolute time information comprises:

calculating a clock error evaluation period based on a performance of a crystal oscillator in the master station, wherein the clock error evaluation period is equal to an evaluation accuracy divided by a crystal oscillator stability of the crystal oscillator and then divided by 10;

calculating a difference between the system time of the master station and a standard clock within the clock error evaluation period; and correcting the system time of the master station based on an error between a next signal and the system time of the master station and the difference.

9. The wireless time servicing system of claim 7, wherein the path information and the time information are broadcast to the slave station at different integer seconds.

* * * * *